United States Patent
Kang

(10) Patent No.: US 9,495,615 B2
(45) Date of Patent: Nov. 15, 2016

(54) METHOD FOR AUTOMATICALLY RECOGNIZING AND SETTING ATTACHMENT AND DEVICE THEREFOR

(71) Applicant: VOLVO CONSTRUCTION EQUIPMENT AB, Eskilstuna (SE)

(72) Inventor: Ho-Jin Kang, Changwon-si (KR)

(73) Assignee: VOLVO CONSTRUCTION EQUIPMENT AB (SE)

( * ) Notice: Subject to any disclaimer, the term of this patent is extended or adjusted under 35 U.S.C. 154(b) by 0 days.

(21) Appl. No.: 14/428,911

(22) PCT Filed: Sep. 20, 2012

(86) PCT No.: PCT/KR2012/007523
§ 371 (c)(1),
(2) Date: Mar. 17, 2015

(87) PCT Pub. No.: WO2014/046313
PCT Pub. Date: Mar. 27, 2014

(65) Prior Publication Data
US 2015/0278638 A1    Oct. 1, 2015

(51) Int. Cl.
*G06K 9/66* (2006.01)
*G06K 9/62* (2006.01)
(Continued)

(52) U.S. Cl.
CPC ............. *G06K 9/6217* (2013.01); *E02F 3/963* (2013.01); *E02F 9/2012* (2013.01); *E02F 9/265* (2013.01); *G06T 7/0022* (2013.01); *G06T 2207/30164* (2013.01)

(58) Field of Classification Search
CPC ........................... G06K 9/6217; G06T 7/0022
USPC .......................................................... 382/190
See application file for complete search history.

(56) References Cited

U.S. PATENT DOCUMENTS 6,061,617 A    5/2000    Berger et al.
6,522,964 B1    2/2003    Miki et al.
(Continued)

FOREIGN PATENT DOCUMENTS

EP    1278917 A1    1/2003
JP    09-085584 A    3/1997
(Continued)

OTHER PUBLICATIONS

Miki et al: An English machine translation of JP11-158940, 1999.*
(Continued)

*Primary Examiner* — Ruiping Li
(74) *Attorney, Agent, or Firm* — Harness, Dickey & Pierce, P.L.C.

(57) ABSTRACT

A method and an apparatus for automatically recognizing and setting an attachment for a construction machine are disclosed. The method for automatically recognizing and setting an attachment includes detecting a kind and a type of the attachment from an attachment image, determining whether the attachment is a registered attachment, and automatically setting inherent functional values that match the attachment if the attachment is a registered attachment as the result of determination and automatically setting a user input attachment ID and functional values if the attachment is not a registered attachment. By automatically recognizing and setting the attachment that is attached to (or changed on) a construction machine (for example, excavator) using image processing, equipment setting can be optimized and easily adopted.

4 Claims, 3 Drawing Sheets

(51) Int. Cl.
   *E02F 3/96*   (2006.01)
   *E02F 9/26*   (2006.01)
   *G06T 7/00*   (2006.01)
   *E02F 9/20*   (2006.01)

(56) References Cited

U.S. PATENT DOCUMENTS

| | | |
|---|---|---|
| 7,441,404 B2 | 10/2008 | Devier et al. |
| 2003/0147727 A1* | 8/2003 | Fujishima ............... E02F 3/435 414/200 |
| 2006/0112685 A1 | 6/2006 | Devier et al. |
| 2008/0005938 A1* | 1/2008 | Aebischer ............... E02F 9/264 37/413 |

FOREIGN PATENT DOCUMENTS

| | | |
|---|---|---|
| JP | 10-237905 A | 9/1998 |
| JP | 11-158940 A | 6/1999 |
| JP | 2006-153278 A | 6/2006 |
| KR | 10-2010-0074557 A | 7/2010 |

OTHER PUBLICATIONS

International Search Report (in Korean and English) and Written Opinion (in Korean) for PCT/KR2012/007523, mailed Apr. 29, 2013; ISA/KR.

Extended European Search Report issued by the European Patent Office (EPO) on Jun. 16, 2016 regarding EP Application No. 12884771.2 (8 pages).

* cited by examiner

METHOD FOR AUTOMATICALLY RECOGNIZING AND SETTING ATTACHMENT AND DEVICE THEREFOR

CROSS-REFERENCE TO RELATED APPLICATION

This application is a 371 U.S. National Stage of International Application No. PCT/KR2012/007523, filed on Sep. 20, 2012. The entire disclosure of the above application is hereby incorporated by reference.

TECHNICAL FIELD

The present invention relates to a method and an apparatus for automatically recognizing and setting an attachment using image processing, and more particularly, to a method and an apparatus for automatically recognizing and setting an attachment using image processing, which can optimize and easily adopt equipment setting according to a change of various attachments in a construction machine, such as an excavator, and thus can make the equipment and the attachment operate normally with a reduced failure rate by automatically recognizing and setting the attachment that is attached to (or changed on) the construction machine (e.g., excavator) using the image processing.

BACKGROUND OF THE INVENTION

At present, if an attachment (e.g., boom, arm, bucket, or breaker) is changed (or replaced) in a construction machine, such as an excavator, an operator should manually perform equipment setting for the changed (or replaced) attachment through an ECU, and this may cause inconvenience to the operator.

However, it is not easy for the operator to optimize and adopt the equipment setting according to the change of the attachment in the construction machine, such as an excavator, and this may cause abnormal operations of the equipment and the attachment and the occurrence of trouble.

In order to solve the above-described problems, through adopting of an image processing technology using a commercialized camera in the construction machine, the equipment setting according to the change of the attachment could be facilitated to contribute to the correct use of the attachment and the reduction of the failure rate.

SUMMARY OF THE INVENTION

Accordingly, the present invention has been made to solve the aforementioned problems occurring in the prior art, and it is an object of the present invention to provide a method and an apparatus for automatically recognizing and setting an attachment using image processing, which can optimize and easily adopt equipment setting according to a change of various attachments in a construction machine, such as an excavator, and thus can make the equipment and the attachment operate normally with a reduced failure rate by automatically recognizing and setting the attachment that is attached to (or changed on) the construction machine (e.g., excavator) using the image processing.

TECHNICAL SOLUTION

To achieve the above objects, in accordance with an embodiment of the present invention, there is provided a method for automatically recognizing and setting an attachment for a construction machine having image capturing means attached thereto, which includes detecting a kind and a type of the attachment using an attachment image captured by the image capturing means; determining whether the detected attachment is a registered attachment; and automatically setting inherent functional values (e.g., hydraulic pressure, flow rate, and response speed) that match the attachment if the attachment is a registered attachment as the result of determination, and automatically setting a user input attachment ID and functional values if the attachment is not a registered attachment.

Preferably, the step of automatically setting a user input attachment ID and functional values automatically recognizes and sets the corresponding attachment ID and inherent functional values which are recommended by a supplier and match the attachment in a product specification input table which is captured by the image capturing means, and automatically setting the user input attachment ID and the functional values if there is not the product specification input table.

Further, the method for automatically recognizing and setting an attachment according to the embodiment of the present invention may further includes changing the inherent function values of the attachment to registered user setting values (e.g., flow rate, hydraulic pressure, flow rate increase, and reduced speed) and automatically setting the changed values if there are the registered user setting values after the automatic setting step.

In accordance with another embodiment of the present invention, there is provided an apparatus for automatically recognizing and setting an attachment, which includes an attachment recognition unit detecting a kind and a type of the attachment using an attachment image captured by predetermined image capturing means; an attachment registration/non-registration determination unit determining whether the attachment is a registered attachment; and an attachment setting unit automatically setting inherent functional values which match the attachment and are recommended by a supplier if the attachment is a registered attachment as the result of determination, and automatically setting a user input attachment ID and functional values if the attachment is not a registered attachment.

Preferably, the attachment setting unit automatically recognizes and sets the corresponding attachment ID and inherent functional values which are recommended by the supplier and match the attachment in a product specification input table which is captured by the image capturing means, and automatically setting the user input attachment ID and the functional values if there is not the product specification input table.

The apparatus for automatically recognizing and setting an attachment according to the embodiment of the present invention may further includes an attachment correction unit changing the inherent function values of the attachment to registered user setting values and automatically setting the changed values if there are the registered user setting values.

Advantageous Effect

According to the method and the apparatus for automatically recognizing and setting an attachment using image processing, the kind and the type of the attachment that is attached to (or changed on) the construction machine (e.g., excavator) are detected through the image processing of the attachment image, and if the detected attachment is a registered attachment, the inherent functional values which match the attachment and are recommended by the supplier are automatically set in the ECU, while if the detected attachment is not a registered attachment, the user input attachment ID and the functional values are automatically set. Accordingly, the equipment setting according to the change of various attachments in the construction machine, such as an excavator, can be optimized and easily adopted, and the equipment and the attachment can operate normally with a reduced failure rate.

Further, according to circumstances, since the inherent function values of the attachment that are recommended by the supplier can be changed to the registered user setting values and the changed values can be automatically set through the ECU, the equipment and the attachment can operate normally and the failure rate can be reduced more effectively.

BRIEF DESCRIPTION OF THE DRAWINGS

The above objects, other features and advantages of the present invention will become more apparent by describing the preferred embodiments thereof with reference to the accompanying drawings, in which.

EXPLANATION OF REFERENCE NUMERALS FOR MAIN PARTS IN THE DRAWING

Figure 1:
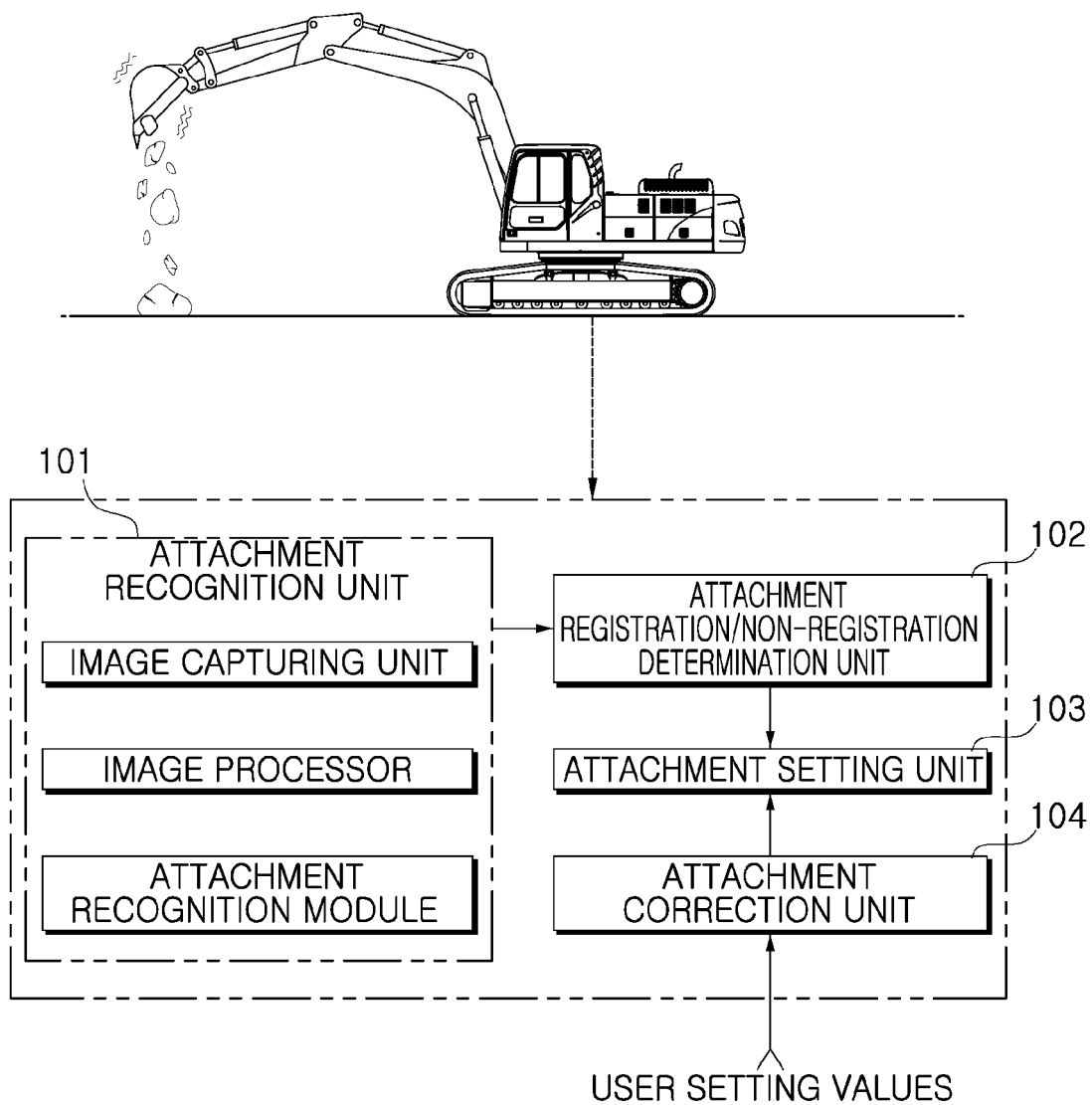
FIG. 1 is a view illustrating an apparatus for automatically recognizing and setting an attachment using image processing according to the present invention.

101: attachment recognition unit
102: attachment registration/non-registration determination unit
103: attachment setting unit
104: attachment correction unit

DETAILED DESCRIPTION OF THE INVENTION

Now, preferred embodiments of the present invention will be described in detail with reference to the accompanying drawings. The matters defined in the description, such as the detailed construction and elements, are nothing but specific details provided to assist those of ordinary skill in the art in a comprehensive understanding of the invention, and the present invention is not limited to the embodiments disclosed hereinafter.

For clear explanation of the present invention, portions that do not have relation to the explanation are omitted, and in the entire description of the present invention, similar drawing reference numerals are used for the similar elements across various figures.

In the entire description and claims of the present invention, the term "comprises" and/or "includes" used in the description means that one or more other components are not excluded in addition to the described components unless specially described on the contrary.

FIG. 1 is a view illustrating an apparatus for automatically recognizing and setting an attachment using image processing according to the present invention.

As illustrated in FIG. 1, an apparatus for automatically recognizing and setting an attachment using image processing according to the present invention may be used in a construction machine having image capturing means (e.g., camera) attached thereto, and is configured to briefly include an attachment recognition unit 101, an attachment registration/non-registration determination unit 102, and an attachment setting unit 103. In addition, the apparatus may further include an attachment correction unit 104.

For reference, the term "automatic setting change" according to the present invention means that in performing inherent functions of an attachment, such as hydraulic pressure, a flow rate, and an attachment response speed in the case of a hydraulic device, automatic setting values are changed to set values that are recommended by a supplier and set values to which user's characteristics are applied according to an automatic determination function of an ECU.

In the case where the image capturing means (e.g., camera) captures an image of an attachment (e.g., bucket, breaker, crusher, or hammer) that is currently attached (or changed), the attachment recognition unit 101 receives a captured image of the attachment from the image capturing means, and recognizes and detects a kind and a type of the attachment that is currently attached (or changed) through image processing of the input image. For example, the attachment recognition unit 101 detects the kind of the attachment, i.e., whether the attachment is a bucket or a breaker, and the type of the attachment including a company name. Specifically, the attachment recognition unit 101 may be configured to include an image capturing unit capturing the image of the attachment from the image capturing means, an image processor performing image processing of the image that is captured by the image capturing unit, and an attachment recognition module recognizing and detecting the kind and the type of the attachment that is currently attached (or changed) from the result of the image processing.

The attachment registration/non-registration determination unit 102 determines whether the attachment, of which the kind and the type are detected by the attachment recognition unit 101, is a registered attachment. That is, information about various kinds of attachments is pre-registered in a memory, and if there is an attachment of which the kind and the type are detected by the attachment recognition unit 101, the attachment registration/non-registration determination unit 102 determines whether the attachment of which the kind and the type are detected by the attachment recognition unit 101 is a registered attachment through comparison of the detected attachment information with the registered attachment information.

The attachment setting unit 103 automatically sets inherent functional values (e.g., hydraulic pressure, flow rate, and response speed) which match the attachment and are recommended by a supplier through an ECU if the detected attachment is a registered attachment as the result of the determination by the attachment registration/non-registration determination unit 102, and automatically sets an attachment ID and functional values input by a user if the detected attachment is not a registered attachment. In this case, if the detected attachment is not a registered attachment, the attachment setting unit 103 automatically recognizes and sets the corresponding attachment ID and the inherent functional values which are recommended by the supplier and match the attachment in a product specification input table which is captured by the image capturing means, and automatically sets the attachment ID and the functional values directly input by the user if there is not the product specification input table.

The attachment correction unit 104 changes the inherent function values of the attachment, which are recommended by the supplier, to registered user setting values (e.g., flow rate, hydraulic pressure, flow rate increase, and reduced speed) and automatically sets the changed values through the ECU if there are the registered user setting values.

Hereinafter, the operation of the apparatus for automatically recognizing and setting an attachment using image processing of FIG. 1 according to the present invention will be described with reference to FIGS. 2A and 2B.

Figure 2A:
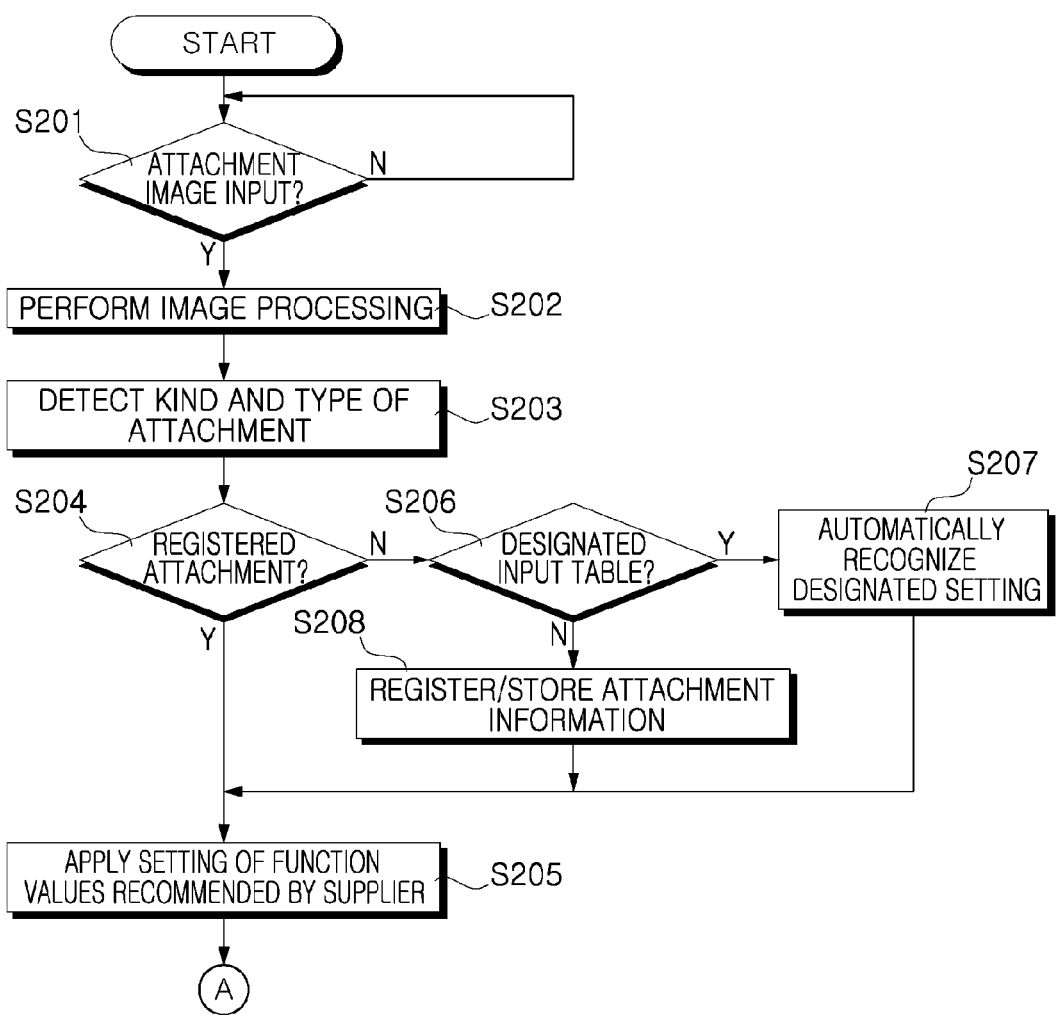
FIGS. 2A and 2B are flowcharts illustrating in order the operation of an apparatus for automatically recognizing and setting an attachment using image processing according to the present invention.
Figure 2B:
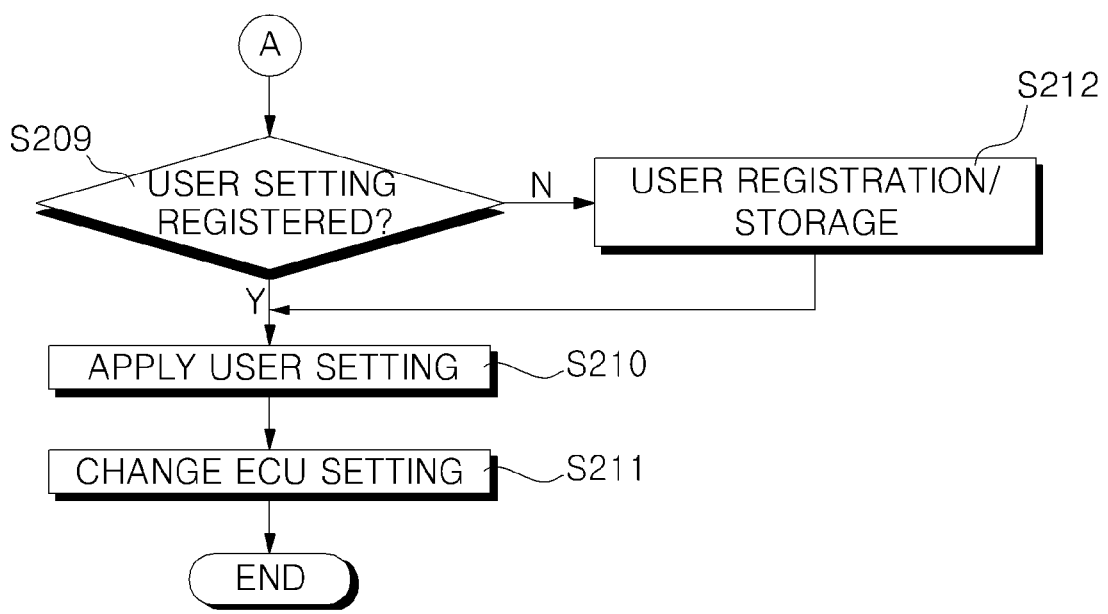

FIGS. 2A and 2B are flowcharts illustrating in order the operation of an apparatus for automatically recognizing and setting an attachment using image processing according to the present invention.

As illustrated in FIG. 2, the attachment recognition unit of the apparatus according to the present invention first receives a captured image of an attachment from the image capturing means (e.g., camera) (S201).

That is, in the case where the image capturing means (e.g., camera) captures the image of the attachment (e.g., bucket, breaker, crusher, or hammer) that is currently attached (or changed), the attachment recognition unit receives the captured image of the attachment that is currently attached (or changed) from the image capturing means.

Then, the attachment recognition unit recognizes and detects a kind and a type of the attachment that is currently attached (or changed) through image processing of the input image (S202 and S203).

For example, the image capturing unit detects the kind of the attachment, i.e., whether the attachment is a bucket or a breaker, and the type of the attachment including a company name.

Specifically, the attachment recognition unit captures the image of the attachment from the image capturing means, performs image processing of the captured image, and then recognizes and detects the kind and the type of the attachment that is currently attached (or changed) from the result of the image processing.

Next, the attachment registration/non-registration determination unit determines whether the attachment, of which the kind and the type are detected by the attachment recognition unit, is a registered attachment (S204).

That is, information about various kinds of attachments is pre-registered in a memory, and if there is an attachment of which the kind and the type are detected by the attachment recognition unit, the attachment registration/non-registration determination unit determines whether the attachment of which the kind and the type are detected by the attachment recognition unit is a registered attachment through comparison of the detected attachment information with the registered attachment information.

Next, the attachment setting unit automatically sets inherent functional values (e.g., hydraulic pressure, flow rate, and response speed) which match the attachment and are recommended by a supplier through an ECU if the detected attachment is a registered attachment as the result of the determination by the attachment registration/non-registration determination unit (S205).

In contrast, the attachment setting unit automatically sets an attachment ID and functional values input by a user if the detected attachment is not a registered attachment.

In this case, if the detected attachment is not a registered attachment, the attachment setting unit automatically recognizes and sets the corresponding attachment ID and the inherent functional values which are recommended by the supplier and match the attachment in a product specification input table which is captured by the image capturing means (S206 and S207).

Further, if there is not the product specification input table, the attachment setting unit automatically sets the attachment ID and the functional values directly input by the user (S208).

On the other hand, if there are registered user setting values (e.g., flow rate, hydraulic pressure, flow rate increase, and reduced speed), the attachment correction unit changes the inherent function values of the attachment, which are recommended by the supplier, using the registered user setting values, and automatically sets the changed values through the ECU (S209 to S211).

As described above, according to the method and the apparatus for automatically recognizing and setting an attachment using image processing, the kind and the type of the attachment that is attached to (or changed on) the construction machine (e.g., excavator) are detected through the image processing of the attachment image, and if the detected attachment is a registered attachment, the inherent functional values which match the attachment and are recommended by the supplier are automatically set in the ECU, while if the detected attachment is not a registered attachment, the user input attachment ID and the functional values are automatically set. Accordingly, the equipment setting according to the change of various attachments in the construction machine, such as an excavator, can be optimized and easily adopted, and the equipment and the attachment can operate normally with a reduced failure rate.

Further, according to circumstances, since the inherent function values of the attachment that are recommended by the supplier can be changed to the registered user setting values and the changed values can be automatically set through the ECU, the equipment and the attachment can operate normally and the failure rate can be reduced more effectively.

Although the invention has been described with reference to the preferred embodiments in the attached figures, it is noted that equivalents may be employed and substitutions made herein without departing from the scope of the invention as recited in the claims.

INDUSTRIAL APPLICABILITY

The present invention can be used in the method and the apparatus for automatically recognizing and setting an attachment using image processing, which can optimize and easily adopt the equipment setting according to the change of various attachments in the construction machine, such as the excavator, and thus can make the equipment and the attachment operate normally with a reduced failure rate by automatically recognizing and setting the attachment that is attached to (or changed on) the construction machine (e.g., excavator) using the image processing.

While the present invention has been described in connection with the specific embodiments illustrated in the drawings, they are merely illustrative, and the invention is not limited to these embodiments. It is to be understood that various equivalent modifications and variations of the embodiments can be made by a person having an ordinary skill in the art without departing from the spirit and scope of the present invention. Therefore, the true technical scope of the present invention should not be defined by the above-mentioned embodiments but should be defined by the appended claims and equivalents thereof.

The invention claimed is:

1. A method for automatically recognizing and setting an attachment for a construction machine including an image capturing device, the method comprising:

detecting a kind and a type of the attachment using an attachment image captured by the image capturing device;

determining whether the detected attachment is a registered attachment; and automatically setting inherent functional values that match the attachment if the attachment is a registered attachment as the result of determination, and automatically setting a user input attachment ID and functional values if the attachment is not a registered attachment;

wherein the step of automatically setting the user input attachment ID and functional values automatically recognizes and sets the corresponding attachment ID and inherent functional values, which are recommended by a supplier and match the attachment in a product specification input table, which is captured by the image capturing device, and automatically setting the user input attachment ID and the functional values if there is not the product specification input table.

2. The method according to claim 1, further comprising changing the inherent function values of the attachment to registered user setting values and automatically setting the changed values if there are the registered user setting values after the automatic setting step.

3. An apparatus for automatically recognizing and setting an attachment of a construction machine through a controller, comprising:

an attachment recognizer including an image capturing device configured to capture an image of the attachment, an image processor configured to process the image, and an attachment recognition module configured to recognize and detect a kind and a type of the attachment that is currently attached, or changed, based on the image;

an attachment registration/non-registration determiner configured to determine whether the attachment is a registered attachment;

an attachment setting device configured to set inherent functional values that match the attachment and are recommended by a supplier if the attachment is a registered attachment as the result of determination, and automatically setting a user input attachment ID and functional values if the attachment is not a registered attachment; and an attachment corrector configured to change the inherent function values of the attachment to registered user setting values and automatically setting the changed values if there are registered user setting values;

wherein the attachment recognizer, the attachment registration/non-registration determiner, and the attachment setting device are in communication with the ECU.

4. The apparatus according to claim 3, wherein the attachment setting device automatically recognizes and sets the corresponding attachment ID and inherent functional values which are recommended by the supplier and match the attachment in a product specification input table which is captured by the image capturing device, and automatically setting the user input attachment ID and the functional values if there is not the product specification input table.

* * * * *